(12) United States Patent
Kaneko

(10) Patent No.: US 8,531,635 B2
(45) Date of Patent: Sep. 10, 2013

(54) LIQUID-CRYSTAL DISPLAY APPARATUS

(75) Inventor: Hideki Kaneko, Tottori (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 100 days.

(21) Appl. No.: 13/084,953

(22) Filed: Apr. 12, 2011

(65) Prior Publication Data

US 2012/0262656 A1    Oct. 18, 2012

(51) Int. Cl.
G02F 1/1337    (2006.01)

(52) U.S. Cl.
USPC ............................................................ 349/129

(58) Field of Classification Search
USPC ............................................................ 349/129
See application file for complete search history.

(56) References Cited

U.S. PATENT DOCUMENTS

| | | | |
|---|---|---|---|
| 6,256,081 B1 | 7/2001 | Lee et al. | |
| 7,859,630 B2 * | 12/2010 | Wakabayashi | 349/141 |
| 2002/0041354 A1 | 4/2002 | Noh et al. | |
| 2007/0195250 A1 * | 8/2007 | Onogi et al. | 349/141 |
| 2007/0229749 A1 | 10/2007 | Kaneko et al. | |
| 2009/0128727 A1 * | 5/2009 | Yata | 349/46 |

FOREIGN PATENT DOCUMENTS

| | | |
|---|---|---|
| JP | 2000-010110 | 1/2000 |
| JP | 2002-182230 | 6/2002 |
| JP | 2007-264231 | 10/2007 |

* cited by examiner

Primary Examiner — Wen-Ying P Chen
(74) Attorney, Agent, or Firm — K&L Gates LLP

(57) ABSTRACT

Disclosed herein is a liquid-crystal display apparatus including: a pair of substrates facing each other to sandwich a liquid-crystal layer; signal and scan lines laid out in a matrix form to sandwich a first insulation film on one of the substrates; a lower electrode created in each area enclosed by the signal and scan lines; a second insulation film created on a surface of the lower electrode; an upper electrode on which a plurality of slits are created in parallel all over an entire surface of the second insulation film; and an oriented film created to cover surfaces of the upper electrode and the second insulation film.

5 Claims, 5 Drawing Sheets

FIG.3A
FIG.3B
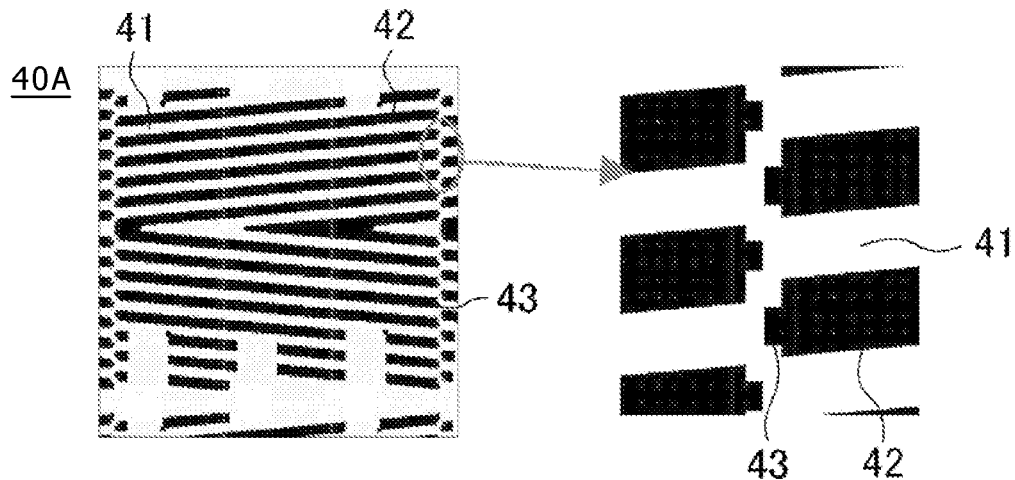
FIG.4
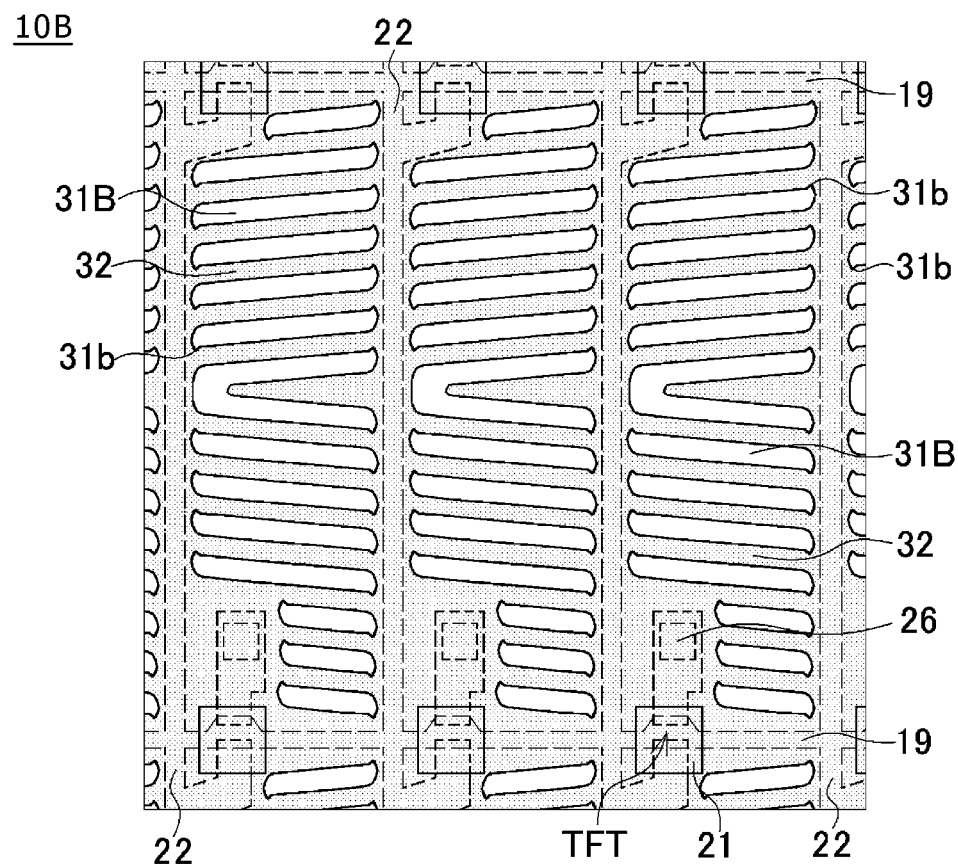

LIQUID-CRYSTAL DISPLAY APPARATUS

CROSS REFERENCES TO RELATED APPLICATIONS

The present application contains subject matter related to that disclosed in Japanese Priority Patent Application JP 2008-256065 filed in the Japan Patent Office on Oct. 1, 2008, the entire content of which is hereby incorporated by reference.

BACKGROUND

The present application relates to a liquid-crystal display apparatus operating in an FFS (Fringe Field Switching) mode. More particularly, the present application relates to a liquid-crystal display apparatus operating in an FFS mode of a two-domain type in which two slit portions having orientation directions different from each other are joined together to each other.

In comparison with the CRT (Cathode Ray Tube) display apparatus, the liquid-crystal display apparatus has characteristics that the liquid-crystal display apparatus is thin as well as light and consumes little power. Thus, the liquid-crystal display apparatus is used in a number of electronic apparatus as a display unit. In the liquid-crystal display apparatus, liquid-crystal molecules are aligned in a direction determined in advance by carrying out a rubbing process for an oriented film. Then, the direction of each liquid-crystal molecule is changed by an electric field in order to vary light quantities such as the quantity of transmitted light and the quantity of reflected light so as to display an image.

As methods for applying an electric field to a liquid-crystal layer employed in a liquid-crystal display apparatus, there are a vertical electric field method and a horizontal electric field method which are adopted as follows.

In a liquid-crystal display apparatus adopting the vertical electric field method, a pair of electrodes provided to sandwich a liquid-crystal layer apply an electric field oriented in approximately vertical direction to liquid-crystal molecules. As liquid-crystal display apparatus adopting the vertical electric field method, there are liquid-crystal display apparatus such as a liquid-crystal display apparatus operating in a TN (Twisted Nematic) mode, a liquid-crystal display apparatus operating in a VA (Vertical Alignment) mode and a liquid-crystal display apparatus operating in an MVA (Multi-domain Vertical Alignment) mode.

In a liquid-crystal display apparatus adopting the horizontal electric field method, on the other hand, a pair of substrates are provided to sandwich a liquid-crystal layer. A specific side of the liquid-crystal layer is a side close to one of the substrates. On this specific side of the liquid-crystal layer, a pair of electrodes insulated from each other are provided to serve as electrodes for applying an electric field oriented in approximately horizontal direction to liquid-crystal molecules. As liquid-crystal display apparatus adopting the horizontal electric field method, there are liquid-crystal display apparatus such as a liquid-crystal display apparatus operating in an IPS (In-Plane Switching) mode and a liquid-crystal display apparatus operating in an FFS mode. The IPS mode is known as a mode in which the two electrodes are not placed at locations superposed on each other if seen in a planar view. On the other hand, the FFS mode is known as a mode in which the two electrodes are placed at locations superposed on each other if seen in a planar view.

In particular, in the liquid-crystal display apparatus operating in the FFS mode, the two electrodes insulated from each other by an insulation film are upper and lower electrodes provided on different layers. The upper electrode is provided with slit openings. An electric field passing through the slit openings in approximately horizontal direction is applied to liquid-crystal molecules. The liquid-crystal display apparatus operating in the FFS mode has effects that the apparatus is capable of providing a large viewing-field angle and improving the contrast of the image. Thus, the liquid-crystal display apparatus operating in the FFS mode is used in a number of applications in recent years.

As described above, in the liquid-crystal display apparatus operating in the FFS mode, the upper electrode is provided with a plurality of slit openings. If the slit openings are oriented in one inclined direction, that is, if the slit openings are configured to adopt a one-domain type, gaps ranging from the gap between two adjacent slit openings to the gap between the electrodes can each be made constant. Thus, a high aperture ratio and a high transmission factor can be achieved. If the slit openings are oriented in two directions, that is, if the slit openings are configured to adopt a two-domain type, it is possible to provide a large viewing-field angle and improve the contrast of the image. For details, the reader is advised to refer to Japanese Patent Laid-open Nos. 2000-010110 and 2002-182230. If the slit openings are configured to adopt a two-domain type, however, due to portions obtained as a result of orienting the slit openings in the two inclined directions, there are locations at which gaps ranging from the gap between two adjacent slit openings to the gap between the electrodes become large. It is not possible to effectively make use of locations, at which gaps ranging from the gap between two adjacent slit openings to the gap between the electrodes become large, as locations for displaying an image. Thus, the aperture ratio virtually decreases. In order to solve this problem, in a liquid-crystal display apparatus disclosed in Japanese Patent Laid-open No. 2007-264231 as a liquid-crystal display apparatus operating in the FFS mode, the slit openings oriented in directions different from each other are joined to each other in order to reduce the number of edges. By reducing the number of edges, it is possible to convert the configuration of the slit openings into a configuration of the two-domain type and increase the aperture ratio.

SUMMARY

As described above, if two slits oriented in different orientation directions are created, two domains are also created on each of the slits. Since the orientation of liquid-crystal molecules in one of the two domains is different from the orientation of liquid-crystal molecules in the other domain, it is possible to provide merits of a high aperture ratio and a good viewing-field angle characteristic. Particularly, in the case of a liquid-crystal display apparatus operating in the FFS mode of a horizontal-slit two-domain type, the amount of display unevenness is small and the productivity is excellent. Thus, the liquid-crystal display apparatus can be produced in a large number of forms. In the case of a liquid-crystal display apparatus operating in the FFS mode of a horizontal-slit two-domain type, however, the number of non-display areas increases. Typical examples of the non-display area are an area in which a slit cannot be created and an area allocated to TFT (Thin Film Transistors) each serving as a switching device. With progress made in recent years in technologies of the high-definition liquid-crystal display apparatus, the size of the area of each pixel decreases. Therefore, there is a rising demand for a liquid-crystal display apparatus having a high aperture ratio making the liquid-crystal display apparatus capable of displaying a bright screen.

It is thus an aim of the present application addressing the problems described above to provide a liquid-crystal display apparatus operating in the FFS mode of a horizontal-slit type to function as a liquid-crystal display apparatus operating in the FFS mode of a two-domain type. The liquid-crystal display apparatus operating in the FFS mode of a two-domain type offers a high aperture ratio, provides small differences in display area between colors and is capable of keeping up with any changes of the pixel pitch.

In order to achieve the aim described above, a liquid-crystal display apparatus according to an embodiment is provided with a pair of substrates facing each other to sandwich a liquid-crystal layer. The liquid-crystal display apparatus also has signal and scan lines laid out in a matrix form to sandwich a first insulation film on a one of the substrates. The liquid-crystal display apparatus also has a lower electrode created in each area enclosed by the signal and scan lines. The liquid-crystal display apparatus also has a second insulation film created on the surface of the lower electrode. The liquid-crystal display apparatus also has an upper electrode on which a plurality of slits are created in parallel all over the entire surface of the second insulation film. The liquid-crystal display apparatus also has an oriented film created to cover the surfaces of the upper electrode and the second insulation film. The orientation direction of each of the slits created on the upper electrode can be one of two inclined orientation directions different from each other with respect to a row direction. In the liquid-crystal display apparatus, the slits are joined to each other in a row direction for every pixel and, on an edge of each of the slits, a small protruding portion is created to protrude in the row direction at the width-direction center of the slit. In addition, on an unconnected portion between two pixels adjacent to each other in the row direction, the small protruding portions for the pixels adjacent to each other in the row direction are placed at locations close to each other.

As described above, the liquid-crystal display apparatus according to the embodiment has a second insulation film created on the surface of the lower electrode. The liquid-crystal display apparatus also has an upper electrode on which a plurality of slits are created in parallel all over the entire surface of the second insulation film. The liquid-crystal display apparatus also has an oriented film created to cover the surfaces of the upper electrode and the second insulation film. The orientation direction of each of the slits created on the upper electrode can be one of two inclined orientation directions different from each other with respect to the row direction. With this configuration, the liquid-crystal display apparatus according to the embodiment functions as a liquid-crystal display apparatus operating in an FFS mode of a two-domain type in which slits are created in the row direction also referred to as a horizontal direction.

It is to be noted that the technical term 'row direction' used in this application specification implies a direction parallel to the scan lines of the liquid-crystal display apparatus. In addition, the technical term 'a pixel' used in this application specification implies a combination of a plurality of sub-pixels placed at locations adjacent to each other to serve as sub-pixels which have different colors and are capable of displaying a white color. For example, if the sub-pixels are sub-pixels of the R (red), G (green) and B (blue) colors, these sub-pixels of the R (red), G (green) and B (blue) colors form one pixel. In addition, since the upper electrode of the liquid-crystal display apparatus according to the embodiment is created all over the entire surface of the second insulation film, the upper electrode can be used as a common electrode.

On top of that, in the liquid-crystal display apparatus according to the embodiment, the slits are joined to each other in a row direction for every pixel and, on an edge of each of the slits, a small protruding portion is created to protrude in the row direction at the width-direction center of the slit. In addition, on an unconnected portion between two pixels adjacent to each other in the row direction, the small protruding portions for the pixels adjacent to each other in the row direction are placed at locations close to each other.

If slits created on the upper electrode are joined to each other for all pixels provided in the row direction, no disclination generating area is created in every sub-pixel. In addition, a high aperture ratio can be implemented. On top of that, the display areas can also be made uniform for all sub-pixels of different colors. In the liquid-crystal display apparatus, however, the pixel pitch is changed in accordance with the size of the liquid-crystal display apparatus and the high definition of the apparatus. If slits created on the upper electrode are joined to each other for all pixels provided in the row direction, it is necessary to change the angle of the slit created on the upper electrode in order to keep up with the changes of the pixel pitch. If the angle of the slit created on the upper electrode is changed as described above, the optical characteristic of the liquid-crystal display apparatus inevitably varies from apparatus to apparatus so that the liquid-crystal display apparatus is not proper for mass production. In addition, if slits created on the upper electrode are joined to each other for all pixels provided in the row direction, ripples may be generated in some cases if pressed from the display surface side of the liquid-crystal display apparatus at a white display time. Thus, display unevenness may be generated in some cases.

In addition, if slits created on the upper electrode are joined to each other only for every pixel in the row direction, in comparison with a configuration in which a plurality of slits in one pixel are not joined to each other in the row direction, the aperture ratio can be raised but, due to the existence of the two row-direction edges of one pixel, the display area of the color sub-pixel unavoidably varies from sub-pixel to sub-pixel so that the color design of the liquid-crystal display apparatus undesirably becomes difficult.

In the liquid-crystal display apparatus according to the embodiment, however, the slits created on the upper electrode are joined to each other in a row direction for every pixel and, on an edge of each of the slits, a small protruding portion is created to protrude in the row direction at the width-direction center of the slit. In addition, on an unconnected portion between two pixels adjacent to each other in the row direction, the small protruding portions for the pixels adjacent to each other in the row direction are placed at locations close to each other. With such a configuration, on an unconnected portion between two pixels adjacent to each other in the row direction, the small protruding portions for the pixels adjacent to each other in the row direction are placed at locations close to each other. Thus, from an optical point of view, at the unconnected portion, the slits can be regarded as slits placed in a state of being connected to each other continuously.

For the reasons described above, in accordance with the liquid-crystal display apparatus provided by the present application, a disclination generating area of the unconnected portion can be reduced and the display areas of sub-pixels for different colors can be made all but uniform for all the sub-pixels. In addition, at the unconnected portion, the distance between the small protruding portions of pixels provided at locations adjacent to each other in the row direction can be changed. Thus, the design can be based on the same slit angle with no regard to the pixel pitch. On top of that, in the liquid-crystal display apparatus according to the embodiment, a slit edge is formed for every pixel. Thus, ripples are hardly generated even if pressed from the display surface side of the liquid-crystal display apparatus at a white display time.

In addition, in the liquid-crystal display apparatus according to the embodiment, it is desirable to have the unconnected portion created at a position superposed on the signal line if seen in a planar view.

Since the signal line is made from a metallic material, the signal line is not transparent. Thus, if the unconnected portion is created at a position superposed on the signal line if seen in a planar view, it is no longer necessary in particular to shield the unconnected portion against light. As a result, the aperture ratio does not decrease anymore.

In addition, in the liquid-crystal display apparatus according to the embodiment, it is desirable to place the small protruding portions of pixels adjacent to each other in the row direction to form a zigzag connecting the small protruding portions to each other.

If the small protruding portions of pixels adjacent to each other in the row direction are placed to form a zigzag connecting the small protruding portions to each other, the distance between two small protruding portions can be shortened. It is thus possible to provide a liquid-crystal display apparatus capable of well demonstrating the effects of the present application.

In addition, in the liquid-crystal display apparatus according to the embodiment, it is desirable to incline the orientation direction of each of the slits at an angle $+\alpha$ on the positive side from the row direction and $-\alpha$ on the negative side from the row direction where $\alpha$ is a positive acute angle in the following range: five degrees $\leq \alpha \leq 25$ degrees.

If the acute angle $\alpha$ formed by the orientation direction of the slit and the row direction is set at a value smaller than five degrees, the configuration with such an angle $\alpha$ is virtually the same as a configuration in which all slits are oriented in parallel in one direction. Thus, the effect of improving the viewing-field angle characteristic is lost. If the acute angle $\alpha$ formed by the orientation direction of the slit and the row direction is set at a value greater than 25 degrees, on the other hand, a good viewing-field angle characteristic is obtained. Since the boundary between domains with different liquid-crystal orientation directions is striking, however, such a striking boundary leads to deterioration of the display image quality. That is why, in accordance with the liquid-crystal display apparatus provided by the embodiment, the acute angle $\alpha$ formed by the orientation direction of the slit and the row direction is set at a value in the range of five degrees $\leq \alpha \leq 25$ degrees so that it is possible to provide a liquid-crystal display apparatus attaining a good viewing-field angle characteristic and having an excellent display image quality.

In addition, in the liquid-crystal display apparatus provided by the embodiment, it is desirable to have the lower electrode created on the surface of an inter-layer film formed on one of the substrates.

If the lower electrode is created on the surface of an inter-layer film formed on the substrate, the lower electrode, the insulation film and the upper electrode which compose the liquid-crystal display apparatus operating in the FFS mode are all provided on the inter-layer film. Thus, in accordance with the liquid-crystal display apparatus implemented by an embodiment, it is possible to provide the upper and lower electrodes all over the a wide range of the area occupied by each pixel so that it is possible to obtain a liquid-crystal display apparatus operating in the FFS mode providing an increased aperture ratio and a bright display. It is to be noted that the resin used as a material for making the inter-layer film can be a properly selected resin material having a good optical sensitivity characteristic or a properly selected resin material having no optical sensitivity characteristic. A resin material having a good optical sensitivity characteristic is a resin material with a good transparency property and an excellent insulation property.

Additional features and advantages are described herein, and will be apparent from the following Detailed Description and the figures.

BRIEF DESCRIPTION OF THE FIGURES

FIG. 3A is a diagram showing a CAD pattern of a mask used for creating an upper electrode used in the embodiment whereas FIG. 3B is a diagram showing an enlarged portion of the pattern;

FIG. 4 is a top-view diagram showing an array substrate, which transparently represents the color-filter substrate of a liquid-crystal display apparatus serving as a first typical comparison apparatus, as an array substrate for one pixel;

DETAILED DESCRIPTION

Embodiments of the present application will be described below in detail with reference to the drawings.

A preferred embodiment is explained below by referring to typical implementations, typical comparison configurations and diagrams. However, the preferred embodiment explained below is no more than a typical realization of a technological concept provided by the present application. Thus, the following description of the preferred embodiment is not to be interpreted as description intended to limit the scope of the present application to a liquid-crystal display apparatus according to the embodiment. That is to say, the present application can also be implemented in the same way by other embodiments included in ranges of patent claims appended to this application specification. It is to be noted that, in figures to be referred to in explanations in the application specification, the sizes of each layer and each member are so set that the layer and the member can be recognized with ease from the figures. In other words, in the figures, the scales of each layer and each member may be different from the correct ones. That is to say, each layer and each member are shown in the figures not always in proportion to the actual dimensions of the layer and the member.

Figure 1:
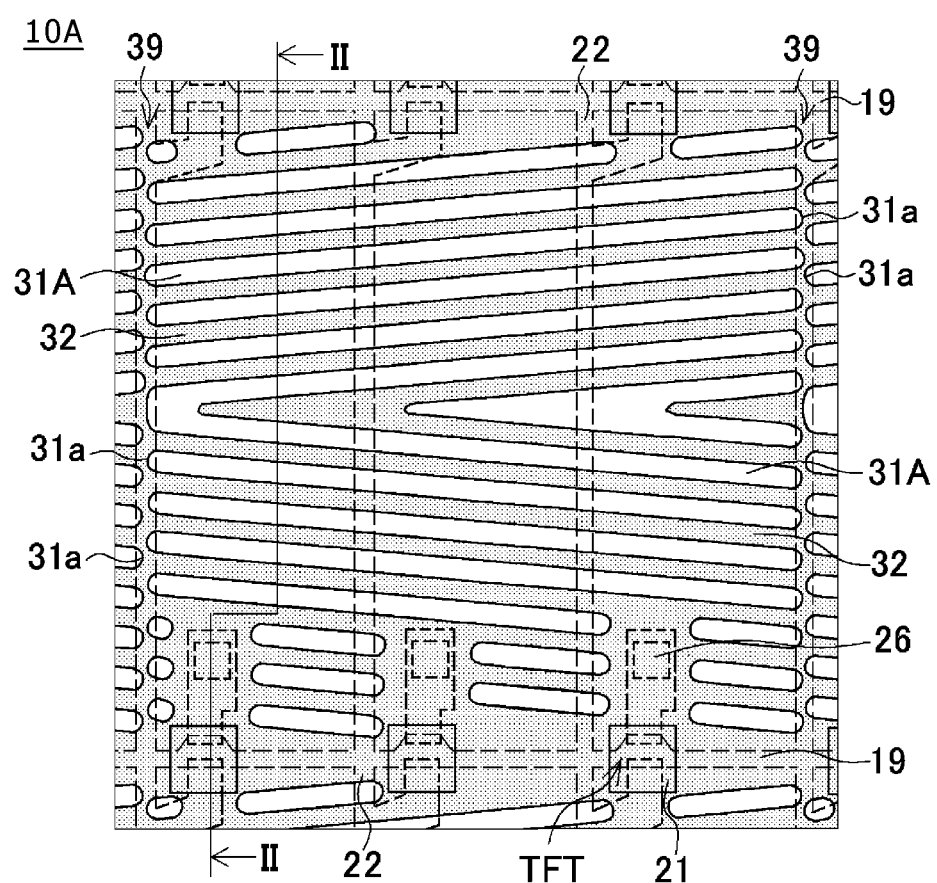
FIG. 1 is a top-view diagram showing an array substrate, which transparently represents the color-filter substrate of a liquid-crystal display apparatus according to an embodiment, as an array substrate for one pixel.
Figure 2:
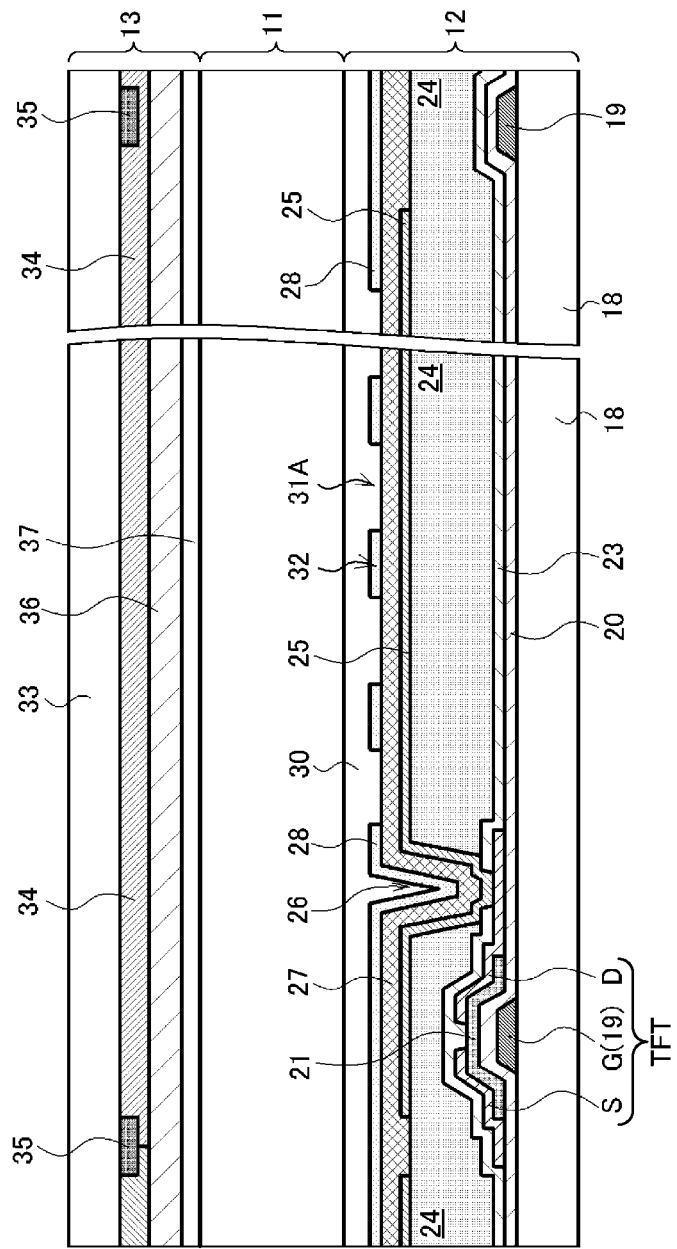
FIG. 2 is a diagram showing a cross section along a line II-II shown in FIG. 1.
Figure 5:
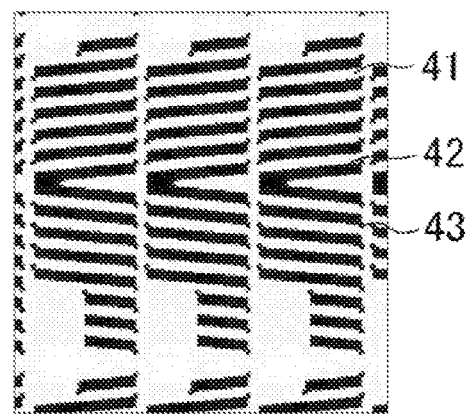
FIG. 5 is a top-view diagram showing a mask, which is used for creating an upper electrode in the liquid-crystal display apparatus serving as the first typical comparison apparatus shown in FIG. 4, as a mask for three sub-pixels.
Figure 6:
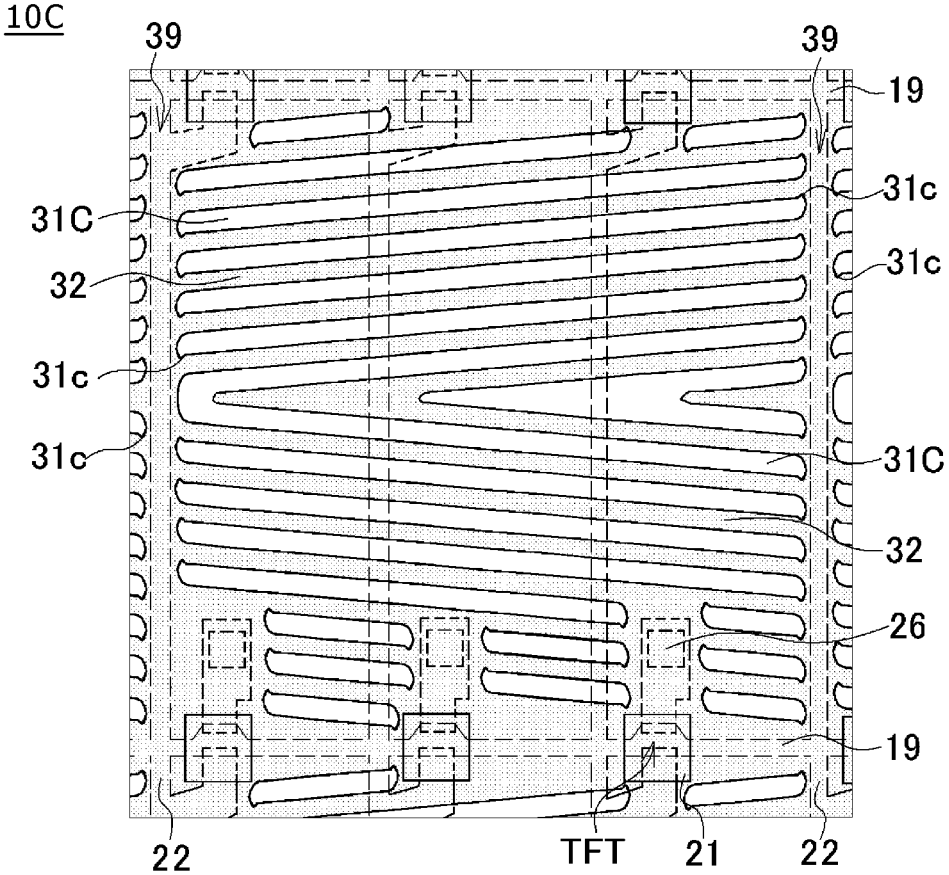
FIG. 6 is a top-view diagram showing an array substrate, which transparently represents the color-filter substrate of a liquid-crystal display apparatus serving as a second typical comparison apparatus, as an array substrate for one pixel.
Figure 7:
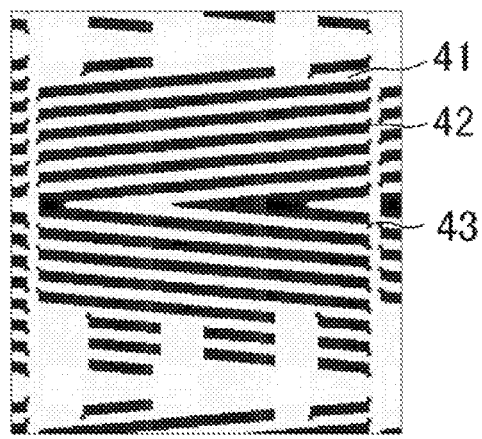
FIG. 7 is a top-view diagram showing a mask, which is used for creating an upper electrode in the liquid-crystal display apparatus serving as the second typical comparison apparatus shown in FIG. 6, as a mask for three sub-pixels.
Figure 8:
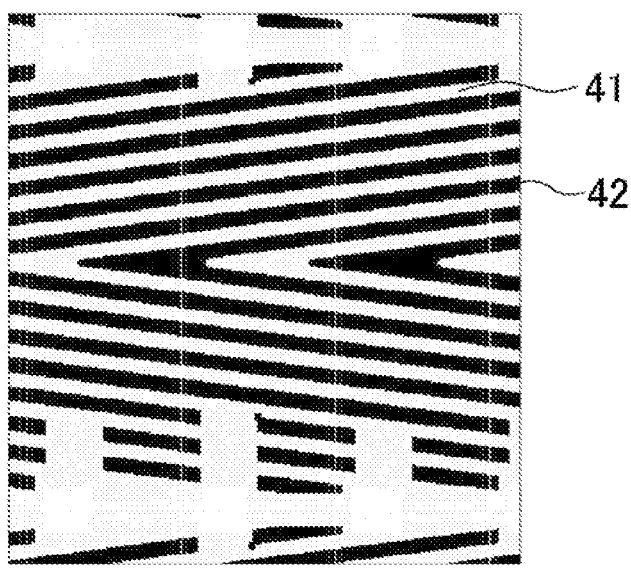
FIG. 8 is a top-view diagram showing a mask, which is used for creating an upper electrode in an liquid-crystal display apparatus serving as a third typical comparison apparatus, as a mask for three sub-pixels.

FIG. 1 is a top-view diagram showing an array substrate, which transparently represents the color-filter substrate of a liquid-crystal display apparatus according to an embodiment, as an array substrate for one pixel;

FIG. 2 is a diagram showing a cross section along a line II-II shown in FIG. 1;

FIG. 3A is a diagram showing a CAD pattern of a mask used for creating an upper electrode used in the embodiment whereas FIG. 3B is a diagram showing an enlarged portion of the pattern;

FIG. 4 is a top-view diagram showing an array substrate, which transparently represents the color-filter substrate of a liquid-crystal display apparatus serving as a first typical comparison apparatus, as an array substrate for one pixel;

FIG. 5 is a top-view diagram showing a mask, which is used for creating an upper electrode in the liquid-crystal display apparatus serving as the first typical comparison apparatus shown in FIG. 4, as a mask for three sub-pixels;

FIG. 6 is a top-view diagram showing an array substrate, which transparently represents the color-filter substrate of a liquid-crystal display apparatus serving as a second typical comparison apparatus, as an array substrate for one pixel;

FIG. 7 is a top-view diagram showing a mask, which is used for creating an upper electrode in the liquid-crystal display apparatus serving as the second typical comparison apparatus shown in FIG. 6, as a mask for three sub-pixels; and FIG. 8 is a top-view diagram showing a mask, which is used for creating an upper electrode in an liquid-crystal display apparatus serving as a third typical comparison apparatus, as a mask for three sub-pixels.

First Embodiment

A liquid-crystal display apparatus 10A according to an embodiment is explained by referring to FIGS. 1 to 3. As shown in FIG. 2, in the liquid-crystal display apparatus 10A according to the embodiment, a liquid-crystal layer 11 is sandwiched by an array substrate 12 and a color-filter substrate 13 in a gap between the array substrate 12 and the color-filter substrate 13. The thickness of the liquid-crystal layer 11 is sustained at a uniform value by pillar-like spacers not shown in the figure. In addition, on each of the rear surface of the array substrate 12 and the front surface of the color-filter substrate 13, a polarization plate not shown in the figure is provided. On top of that, a backlight not shown in the figure radiates light to the rear surface of the array substrate 12.

On the rear side, the array substrate 12 includes a first substrate main body 18 made from a material such as glass, quartz or plastic. A side opposite to the rear side of the first substrate main body 18 is a side close to the liquid-crystal layer 11. On the opposite side of the first substrate main body 18, a plurality of scan lines 19 parallel to each other are provided. The scan line 19 is made from a nontransparent metal such as the aluminum metal, an aluminum alloy or molybdenum. The scan lines 19 are oriented in a row direction (also referred to as a horizontal direction) of a pixel matrix, the cross section of which is shown in FIG. 1. A gate insulation film 20 is created to cover the opposite-side surface of the first substrate main body 18 and the exposure surfaces of the scan lines 19. It is to be noted that the gate insulation film 20 corresponds to a first insulation film of the embodiment. The gate insulation film 20 is an inorganic insulation film made from a substance such as any one of materials ranging from the silicon oxide to the silicon nitride.

A semiconductor layer 21 is created on the gate insulation film 20. The semiconductor layer 21 is made from typically an amorphous silicon material. A source electrode S of a TFT is created on a portion of the semiconductor layer 21 whereas a drain electrode D of the TFT is created on another portion of the semiconductor layer 21. The semiconductor layer 21 is exposed to a partially thickened area of the scan line 19 through the gate insulation film 20. The partially thickened area of the scan line 19 is used as the gate electrode G of the TFT. The source electrode S is a portion branching from a signal line 22. Each of the signal line 22 and the drain electrode D is made from a nontransparent metal such as the aluminum metal, an aluminum alloy or molybdenum. The signal line 22 is oriented in a column direction (also referred to as a vertical direction) of the pixel matrix, the cross section of which is shown in FIG. 1.

A passivation film 23 is created to cover the semiconductor layer 21, the source electrode S, the drain electrode D, the signal line 22 and an exposure portion of the gate insulation film 20. The passivation film 23 is an inorganic insulation film made from a substance such as any one of materials ranging from the silicon oxide to the silicon nitride. An inter-layer film 24 made from resin is created to cover the passivation film 23. The resin used as a material for making the inter-layer film 24 can be a properly selected resin material having a good optical sensitivity characteristic or a properly selected resin material having no optical sensitivity characteristic. A resin material having a good optical sensitivity characteristic is a resin material with a good transparency property and an excellent insulation property. A lower electrode 25 made from a transparent conductive material such as ITO or IZO is created to cover the inter-layer film 24. A contact hole 26 is created by boring through the passivation film 23 and the inter-layer film 24 to the drain electrode D. The lower electrode 25 and the drain electrode D are electrically connected to each other through the contact hole 26. That is why the lower electrode 25 operates as a pixel electrode.

An inter-electrode insulation film 27 is created to cover the lower electrode 25. The inter-electrode insulation film 27 is an inorganic insulation film made from a substance such as any one of materials ranging from the silicon oxide to the silicon nitride. In order to prevent the surfaces of the lower electrode 25 and the inter-layer film 24 from getting rough, the inter-electrode insulation film 27 is created under a low-temperature film formation condition in comparison with the passivation film 23. The inter-electrode insulation film 27 corresponds to a second insulation film of the embodiment. In addition, an upper electrode 28 is created all over the surfaces of the lower electrode 25 and the inter-electrode insulation film 27. These surfaces of the lower electrode 25 and the inter-electrode insulation film 27 are surfaces on the side of the liquid-crystal layer 11. The upper electrode 28 is made from any one of transparent conductive materials ranging from ITO to IZO. As shown in FIG. 1, the upper electrode 28 is provided with a slit 31A for every pixel. The center of the slit 31A coincides with the column-direction center of the pixel for which the slit 31A is provided. The slits 31A are inclined with respect to the column direction at angles different from each other. Slit portions at the column-direction center are linked to each other to form a dogleg shape. In addition, a band electrode portion 32 is created between two adjacent slits 31A. The upper electrode 28 operates as a common electrode. It is to be noted that detailed configurations of the upper electrode 28 and the slit 31A are described as follows.

A first oriented film 30 is created on the surface of the upper electrode 28 and the inner surface of the slit 31A. The rubbing direction of the first oriented film 30 is oriented from the formation state of the slit 31A to the orientation direction of the scan line 19. With respect to the rubbing direction, the orientation direction of the slit 31A is inclined at an angle in the range five to 25 degrees. Thus, when an electric field is applied between the lower electrode 25 and the upper electrode 28, liquid-crystal molecules in areas above and below the column-direction center rotate in directions different from each other. As a result, a good viewing-field angle characteristic can be obtained.

Next, the color-filter substrate 13 is explained as follows. The color-filter substrate 13 has a second substrate main body 33 made from a material such as glass, quartz or plastic. On the second substrate main body 33, a color-filter layer 34 and a black matrix 35 are created. The color-filter layer 34 is a filter for passing light with different colors for every sub-pixel. The light with different colors includes R (red)-color light, G (green)-color light, B (blue)-color light and colorless light. A top coat layer 36 is created to cover the color-filter layer 34 and the black matrix 35 whereas a second oriented film 37 made from typically polyimide is created to cover the top coat layer 36. Then, a rubbing process is carried out on the second oriented film 37 in a direction opposite to the rubbing direction of the first oriented film 30.

Subsequently, the color-filter substrate 13 is set to face the array substrate 12 created as described above and their surrounding edges are sealed by making use of a seal material not shown in the figure. In this way, the liquid-crystal layer 11 is sealed in a hermetically sealed area created between the array substrate 12 and the color-filter substrate 13 so as to provide the liquid-crystal display apparatus 10A according to the embodiment. In the liquid-crystal display apparatus 10A according to the embodiment, the transmission axis of the polarization plate provided on the side of the array substrate 12 is perpendicular to the transmission axis of the polarization plate provided on the side of the color-filter substrate 13. The transmission axis of the polarization plate provided on the side of the color-filter substrate 13 is parallel to the signal line. With such a configuration, the rubbing direction of the first oriented film 30 intersects with the main direction of an electric field generated between the upper electrode 28 and the lower electrode 25. The liquid-crystal molecules of the liquid-crystal layer 11 are oriented in parallel to the rubbing direction in the initial state. Then, as a voltage is applied between the upper electrode 28 and the lower electrode 25, the liquid-crystal molecules of the liquid-crystal layer 11 rotate to the side of the main direction of the electric field, being reoriented. Each pixel produces a bright/dark display based on differences between the initial orientation state and the orientation state obtained as a result of applying the voltage between the upper electrode 28 and the lower electrode 25.

Next, a concrete configuration of the slit 31A created on the upper electrode 28 of the liquid-crystal display apparatus 10A according to the embodiment is explained as follows. The liquid-crystal display apparatus 10A according to the embodiment includes a plurality of aforementioned slits 31A. For every pixel (having three sub-pixels), the slits 31A are linked to each other in the row direction. As shown in FIG. 1, on the edge of every slit 31A, a small protruding portion 31a is created. The small protruding portion 31a protrudes in the row direction at the width-direction center of the slit 31A. On an unconnected portion 39 between two pixels adjacent to each other in the row direction, the small protruding portion 31a of the slit 31A employed in one of the pixels and the small protruding portion 31a of the slit 31A employed in the other pixel are placed at locations adjacent to each other.

The slit 31A is created on the upper electrode 28 by carrying out an etching process according to a photography method after a film made from any one of materials ranging from ITO to IZO has been created on the surface of the inter-electrode insulation film 27. Top views of a mask 40A used in the etching process are shown FIGS. 3A and 3B. In the mask 40A used in this embodiment, a slit pattern 42 made from a light shielding material is created on a transparent substrate. The remaining portion of the mask 40A is used as an upper electrode pattern 41. At the width-direction center on each edge of the slit pattern 42, a small protrusion pattern 43 is created to protrude in the row direction. The small protrusion pattern 43 has a rectangular shape as shown in FIG. 3B. Affected by phenomena such as diffraction of exposure light and scattering of the light, however, the shape of the small protruding portion 31a created on the upper electrode 28 by making use of the mask 40A forms a smooth curve as shown in FIG. 1.

In addition, in order to reduce the distance between the small protruding portions 31a of pixels adjacent to each other in the row direction in the liquid-crystal display apparatus 10A according to the embodiment to a smallest possible value, the small protruding portions 31a are placed to form a zigzag connecting the small protruding portions 31a to each other. With the small protruding portions 31a placed at locations close to each other in this way, from an optical point of view, at the unconnected portion 39, the slits can be regarded as slits placed in a state of being connected to each other continuously. It is to be noted that, in the liquid-crystal display apparatus 10A according to the embodiment, the unconnected portion 39 is created at a location superposed on the signal line 22 if seen in a planar view. Thus, it is not particularly necessary anymore to separately provide means for shielding the unconnected portion 39 against light.

In addition, in the liquid-crystal display apparatus 10A according to the embodiment, the distance between the small protruding portions 31a is small. Thus, the size of a disclination generating area can be reduced and the display areas of sub-pixels for different colors can be made all but uniform for all the sub-pixels. In addition, at the unconnected portion 39, the distance between the small protruding portions 31a of pixels provided at locations adjacent to each other in the row direction can be changed. Thus, the design can be based on the same slit angle with no regard to the pixel pitch. On top of that, in the liquid-crystal display apparatus 10A according to the embodiment, a slit edge is formed for every pixel. Thus, ripples are hardly generated even if pressed from the display surface side of the liquid-crystal display apparatus 10A at a white display time.

The reader is advised to keep in mind that, in the liquid-crystal display apparatus 10A according to the embodiment, it is desirable to incline the orientation direction of a plurality of slits 31A at an angle +α on the positive side from the row direction and −α on the negative side from the row direction where α is a positive acute angle in the following range: five degrees $\leq \alpha \leq 25$ degrees. If the acute angle α formed by the orientation direction of the slit 31A and the row direction is set at a value smaller than five degrees, the configuration with such an angle α is virtually identical with a configuration in which all slits 31A are oriented in parallel in one direction. That is to say, the configuration with such an angle α is virtually identical with the configuration of a liquid-crystal display apparatus operating in the FFS mode of the one-domain type. Thus, the effect of improving the viewing-field angle characteristic is lost. If the acute angle α formed by the orientation direction of the slit 31A and the row direction is set at a value greater than 25 degrees, on the other hand, a good viewing-field angle characteristic is obtained. Since the boundary between domains with different liquid-crystal orientation directions is striking, however, such a striking boundary leads to deterioration of the display image quality. That is why the acute angle α formed by the orientation direction of the slit 31A and the row direction is set at a value in the range of five degrees $\leq \alpha \leq 25$ degrees so that it is possible to provide a liquid-crystal display apparatus 10A attaining a good viewing-field angle characteristic and having an excellent display image quality.

First to Third Typical Comparison Configurations

In order to verify the effects of the present application, the following description explains a liquid-crystal display apparatus serving as a first typical comparison apparatus by referring to FIGS. 4 and 5, a liquid-crystal display apparatus serving as a second typical comparison apparatus by referring to FIGS. 6 and 7 and a liquid-crystal display apparatus serving as a third typical comparison apparatus by referring to FIG. 8. It is to be noted that FIG. 2 can also be seen as a cross-sectional diagram showing portions included in the liquid-crystal display apparatus serving as the first typical comparison apparatus, the liquid-crystal display apparatus serving as the second typical comparison apparatus or the liquid-crystal display apparatus serving as the third typical comparison apparatus as portions corresponding to the portions laid out along a line II-II shown in FIG. 1. Thus, such cross-sectional diagrams are not provided again. In addition, in FIGS. 4 to 8, configuration portions identical with their respective counterparts employed in the liquid-crystal display apparatus 10A according to this embodiment shown in FIGS. 1 to 3 are denoted by the same reference numerals as well as reference symbols as the counterparts and detailed explanation of the identical configuration portions is omitted.

A plurality of slits 31B formed on the upper electrode 28 of the liquid-crystal display apparatus 10B serving as the first typical comparison apparatus are separated from each other into slits 31B each provided for one sub-pixel. On each of the two width-direction edges of every slit 31B, a small protruding portion 31b is created as shown in FIG. 4. In this case, however, the small protruding portion 31b is created on one of the two edges to protrude in a direction opposite to the direction in which the small protruding portion 31b created on the other edge protrudes. In addition, the small protruding portion 31b of the slit 31B is created so that, in the unconnected portion 39 between two pixels adjacent to each other in the row direction, the small protruding portion 31b is positioned inside its sub-pixel and the small protruding portion 31b is not placed at a location superposed on the scan line 19 if seen in a planar view.

FIG. 5 is a top-view diagram showing a mask 40B used in the manufacturing of the upper electrode 28 of the liquid-crystal display apparatus 10B serving as the first typical comparison apparatus. On the mask 40B used in the process of manufacturing the upper electrode 28 of the liquid-crystal display apparatus 10B serving as the first typical comparison apparatus, a slit pattern 42 made from a light shielding member is created on the transparent substrate. The remaining portion of the mask 40B is used as a transparent upper-electrode pattern 41. On each of the two width-direction edges of the slit pattern 42, a small protrusion pattern 43 is created. In this case, however, the small protrusion pattern 43 is created on one of the two edges to protrude in a direction opposite to the direction in which the small protrusion pattern 43 created on the other edge protrudes. The small protrusion pattern 43 is provided in order to narrow the edge of the slit so that a disclination generating area is concentrated on this narrow area. Portions other than the small protrusion pattern 43 and the slit pattern 42 are used as the upper-electrode pattern 41.

As shown in FIG. 4, the liquid-crystal display apparatus 10B serving as the first typical comparison apparatus made by making use of the mask 40B for manufacturing the upper electrode 28 is a liquid-crystal display apparatus operating in the FFS mode of a typical horizontal two-domain type. As is obvious from the figure, the size of a non-display area never turned on is large and it is difficult to raise the display aperture ratio. In addition, in the liquid-crystal display apparatus 10B serving as the first typical comparison apparatus, the edge of the slit 31B is created for every sub-pixel. Thus, a disclination generating area is created for every sub-pixel. However, ripples are hardly generated even if pressed from the display surface side of the liquid-crystal display apparatus 10B at a white display time.

As shown in FIG. 6, a plurality of slits 31C created on the upper electrode 28 of a liquid-crystal display apparatus 10C serving as the second typical comparison apparatus are joined to each other in the row direction for every pixel. On each of the two width-direction edges of every slit 31C, a small protruding portion 31c is created as shown in FIG. 4. In this case, however, the small protruding portion 31c is created on one of the two edges to protrude in a direction opposite to the direction in which the small protruding portion 31c created on the other edge protrudes. In addition, the small protruding portion 31c of the slit 31C is created so that, in the unconnected portion 39 between two pixels adjacent to each other in the row direction, the small protruding portion 31c is positioned inside its sub-pixel and the small protruding portion 31c is not placed at a location superposed on the scan line 19 if seen in a planar view.

FIG. 7 is a top-view diagram showing a mask 40C used in the manufacturing of the upper electrode 28 of the liquid-crystal display apparatus 10C serving as the second typical comparison apparatus. On the mask 40C used in the process of manufacturing the upper electrode 28 of the liquid-crystal display apparatus 10C serving as the second typical comparison apparatus, a slit pattern 42 made from a light shielding member is created on the transparent substrate. The remaining portion of the mask 40C is used as a transparent upper-electrode pattern 41. On each of the two width-direction edges of the slit pattern 42, a small protrusion pattern 43 is created. In this case, however, the small protrusion pattern 43 is created on one of the two edges to protrude in a direction opposite to the direction in which the small protrusion pattern 43 created on the other edge protrudes. Portions other than the small protrusion pattern 43 and the slit pattern 42 are used as the upper-electrode pattern 41.

In the liquid-crystal display apparatus 10C serving as the second typical comparison apparatus made by making use of the mask 40C for manufacturing the upper electrode 28, the relative area of a turned-on portion is greater than that of the liquid-crystal display apparatus 10B serving as the first typical comparison apparatus. It is obvious, however, that the area of a turned-on portion varies from sub-pixel to sub-pixel. Such a phenomenon occurs because, at sub-pixels on the two edges of a pixel, an edge is created on the slit 31C whereas, at the sub-pixel at the center of the pixel, an edge is not created on the slit 31C. In FIG. 7B, the sub-pixel at the center of the pixel is a sub-pixel G. If the area of a turned-on portion varies from sub-pixel to sub-pixel as described above, the color design of the liquid-crystal display apparatus undesirably becomes difficult. It is to be noted that, in the case of the liquid-crystal display apparatus 10C serving as the second typical comparison apparatus, even though a disclination generating area is created in each of sub-pixels on the two edges of a pixel, no disclination generating area is created in the sub-pixel at the center of the pixel. In addition, ripples may be generated in some cases if pressed from the display surface side of the liquid-crystal display apparatus 10C at a white display time.

In the case of the liquid-crystal display apparatus 10D serving as the third typical comparison apparatus, as shown in FIG. 8, in a mask 40D used in the manufacturing of the upper electrode 28, a plurality of slit patterns 42 are linked to each other for all pixels provided in the row direction. Also in this case, a portion other than the slit pattern 42 is used as an upper-electrode pattern 41. It is to be noted that, except that the unconnected portion 39 does not exist in the liquid-crystal display apparatus 10D serving as the third typical comparison apparatus, FIG. 1 showing the liquid-crystal display apparatus 10A according to the embodiment can be regarded as a top-view diagram for one pixel of an array substrate transparently representing the color-filter substrate of the liquid-crystal display apparatus made by making use of the mask 40D used in the manufacturing of the upper electrode 28 of the liquid-crystal display apparatus 10D. Thus, no such a top-view diagram is provided for the liquid-crystal display apparatus 10D serving as the third typical comparison apparatus.

If a liquid-crystal display apparatus is made by making use of the mask 40D used in the manufacturing of the upper electrode 28 of the liquid-crystal display apparatus 10D, theoretically, no disclination generating area is created in every sub-pixel. In addition, a high aperture ratio can be implemented. On top of that, the display areas can also be made uniform for all sub-pixels of different colors. Since the pixel pitch changes in accordance with the size of the liquid-crystal display apparatus and the high definition of the apparatus, however, in the case of the liquid-crystal display apparatus 10D serving as the third typical comparison apparatus, it is necessary to change the angle of the slit created on the upper electrode 28 in order to keep up with the changes of the pixel pitch. If the angle of the slit created on the upper electrode 28 is changed, the optical characteristic of the liquid-crystal display apparatus inevitably varies from apparatus to apparatus so that the liquid-crystal display apparatus is not proper for mass production. In addition, in the case of the liquid-crystal display apparatus 10D serving as the third typical comparison apparatus, ripples may be generated in some cases if pressed from the display surface side of the liquid-crystal display apparatus 10C at a white display time. Thus, display unevenness may be generated in some cases.

If the liquid-crystal display apparatus 10A according to the embodiment is compared with the liquid-crystal display apparatus serving as the first to third typical comparison apparatus, it is obvious that the liquid-crystal display apparatus 10A is characterized in that, in the liquid-crystal display apparatus 10A, slits 31A created on the upper electrode 28 are linked to each other in the row direction for every pixel and, on the edge of every slit 31A, a small protruding portion 31a is created to protrude in the row direction at the width-direction center of the slit 31A. In addition, in an unconnected portion 39 between two pixels adjacent to each other in the row direction, the small protruding portions 31a of the two pixels adjacent to each other in the row direction are provided at locations close to each other.

Thus, in the case of the liquid-crystal display apparatus 10A according to the embodiment, the distance between the small protruding portions 31a of two pixels adjacent to each other in the row direction in the unconnected portion 39 is short. Accordingly, from an optical point of view, in the unconnected portion 39, the slits 31A can be regarded as slits placed in a state of being connected to each other continuously. Therefore, in accordance with the liquid-crystal display apparatus 10A according to the embodiment, the size of the disclination generating area in the unconnected portion 39 can be reduced and the size of the display area can be made all but uniform for all sub-pixels of different colors. In addition, it is possible to change the distance between the small protruding portions 31a of two pixels provided at locations adjacent to each other in the row direction in the unconnected portion 39. Thus, the design can be based on the same slit angle with no regard to the pixel pitch. On top of that, in the liquid-crystal display apparatus 10A according to the embodiment, a slit edge is formed for every pixel. Thus, ripples are hardly generated even if pressed from the display surface side of the liquid-crystal display apparatus 10A at a white display time.

The liquid-crystal display apparatus 10A according to the embodiment has been explained as a typical apparatus in which the lower electrode 25 is created on the surface of the inter-layer film 24. It is to be noted, however, that if the lower electrode 25 is created on the surface of the inter-layer film 24, the lower electrode 25, the inter-electrode insulation film 27 and the upper electrode 28 which compose the liquid-crystal display apparatus 10A operating in the FSS mode are all created on the surface of the inter-layer film 24. Thus, in accordance with the liquid-crystal display apparatus 10A according to the embodiment, the upper electrode 28 and the lower electrode 25 can be placed all over a wide range of the area occupied by each pixel so that it is possible to obtain a liquid-crystal display apparatus operating in the FFS mode providing an increased aperture ratio and a bright display. The resin used as a material for making the inter-layer film 24 can be a properly selected resin material having a good optical sensitivity characteristic or a properly selected resin material having no optical sensitivity characteristic. A resin material having a good optical sensitivity characteristic is a resin material with a good transparency property and an excellent insulation property.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. A liquid-crystal display apparatus comprising:
a pair of substrates facing each other to sandwich a liquid-crystal layer;
signal and scan lines laid out in a matrix form to sandwich a first insulation film on one of said substrates;
a lower electrode created in each area enclosed by said signal and scan lines;
a second insulation film created on a surface of said lower electrode;
an upper electrode on which a plurality of slits are created in parallel all over an entire surface of said second insulation film; and
an oriented film created to cover surfaces of said upper electrode and said second insulation film, wherein
a first set of the slits has a first inclined orientation direction,
a second set of the slits has a second orientation direction which is different from the first orientation with respect to a row direction,
said slits are joined to each other in said row direction for every pixel, on an edge of each of said slits, a small protruding portion is created to protrude from one of the side edges of the slit in said row direction at said width-direction center of said slit, and on an unconnected portion between two pixels adjacent to each other in said row direction, said small protruding portions for said pixels adjacent to each other in said row direction are placed at locations close to each other.

2. The liquid-crystal display apparatus according to claim 1 wherein said unconnected portion is created at a position superposed on said signal line if seen in a planar view.

3. The liquid-crystal display apparatus according to claim 1 wherein said small protruding portions of pixels adjacent to each other in said row direction are placed to form a zigzag connecting said small protruding portions to each other.

4. The liquid-crystal display apparatus according to claim 1 wherein:
   (a) the first orientation direction is inclined at an angle $+\alpha$ on the positive side from said row direction;
   (b) the second orientation direction is inclined at an angle $-\alpha$ on the negative side from said row direction; and
   (c) $\alpha$ is a positive acute angle in the following range: five degrees $\leq \alpha \leq 25$ degrees.

5. The liquid-crystal display apparatus according to claim 1 wherein said lower electrode is created on a surface of an inter-layer film formed on one of said substrates.

* * * * *